(12) United States Patent
Basso et al.

(10) Patent No.: US 8,902,750 B2
(45) Date of Patent: Dec. 2, 2014

(54) TRANSLATING BETWEEN AN ETHERNET PROTOCOL AND A CONVERGED ENHANCED ETHERNET PROTOCOL

(75) Inventors: Claude Basso, Raleigh, NC (US); Anil Pothireddy, Bangalore (IN); Christoph Raisch, Gerlingen (DE); Saravanan Sethuraman, Bangalore (IN); Vibhor K. Srivastava, Sitapur (IN); Jan-Bernd Themann, Tuebingen (DE); Fabrice J. Verplanken, Lagaude (FR)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 13/150,507

(22) Filed: Jun. 1, 2011

(65) Prior Publication Data
US 2011/0299394 A1 Dec. 8, 2011

(30) Foreign Application Priority Data
Jun. 4, 2010 (EP) .................................. 10305594

(51) Int. Cl.
| | |
|---|---|
| H04L 12/801 | (2013.01) |
| H04L 12/26 | (2006.01) |
| H04L 29/06 | (2006.01) |
| H04L 12/823 | (2013.01) |
| H04L 12/835 | (2013.01) |

(52) U.S. Cl.
CPC ................ *H04L 47/10* (2013.01); *H04L 69/08* (2013.01); *H04L 47/17* (2013.01); *H04L 47/34* (2013.01); *H04L 47/32* (2013.01); *H04L 47/30* (2013.01)
USPC ......... 370/235; 370/395.4; 370/250; 370/254

(58) Field of Classification Search
USPC .................................................. 370/202–255
See application file for complete search history.

(56) References Cited

U.S. PATENT DOCUMENTS

| | | | |
|---|---|---|---|
| 5,943,481 | A | 8/1999 | Wakeland |
| 6,425,034 | B1 * | 7/2002 | Steinmetz et al. ............ 710/305 |
| 7,548,983 | B2 | 6/2009 | Przybylski et al. |
| 2004/0062267 | A1 | 4/2004 | Minami et al. |
| 2004/0136711 | A1 * | 7/2004 | Finan et al. ..................... 398/59 |
| 2006/0039380 | A1 * | 2/2006 | Cloonan et al. ............ 370/395.4 |

(Continued)

OTHER PUBLICATIONS

Office Action, U.S. Appl. No. 13/150,486, Mar. 14, 2013, pp. 1-16.

*Primary Examiner* — Andrew Chriss
*Assistant Examiner* — John Lequang
(74) *Attorney, Agent, or Firm* — Edward J. Lenart; Katherine S. Brown; Biggers Kennedy Lenart Spraggins LLP (57) ABSTRACT

Translating between an Ethernet protocol used by a first network component and a Converged Enhanced Ethernet (CEE) protocol used by a second network component, the first and second components coupled through a CEE Converter that translates by: for data flow from the first network component to the second network component: receiving, by the CEE converter, traffic flow definition parameters for a single CEE protocol data flow; calculating, by a credit manager, available buffer space in an outbound frame buffer of the CEE converter for the data flow; communicating, by the credit manager to a CEE credit driver of the first component, the calculated size of the buffer space together with a start sequence number and a flow identifier; and responding, by the CEE credit driver to the CEE converter, with Ethernet frames comprising a private header that includes the flow identifier and a sequence number.

24 Claims, 3 Drawing Sheets

(56) References Cited

U.S. PATENT DOCUMENTS

| | | |
|---|---|---|
| 2006/0098681 A1* | 5/2006 | Cafiero et al. ............... 370/445 |
| 2006/0251067 A1* | 11/2006 | DeSanti et al. ............. 370/389 |
| 2008/0301336 A1* | 12/2008 | Bilak et al. ..................... 710/56 |
| 2009/0034522 A1* | 2/2009 | Hayes et al. ................. 370/389 |
| 2009/0052346 A1 | 2/2009 | Brown et al. |
| 2009/0052461 A1 | 2/2009 | Brown et al. |
| 2009/0245791 A1 | 10/2009 | Thaler et al. |
| 2010/0115132 A1* | 5/2010 | Hirata et al. ................. 709/245 |
| 2011/0058573 A1* | 3/2011 | Balakavi et al. .............. 370/463 |
| 2011/0261826 A1* | 10/2011 | Armstrong et al. .......... 370/401 |
| 2011/0302481 A1 | 12/2011 | Calvignac et al. |
| 2012/0213507 A1* | 8/2012 | Decusatis et al. ............... 398/24 |

* cited by examiner

TRANSLATING BETWEEN AN ETHERNET PROTOCOL AND A CONVERGED ENHANCED ETHERNET PROTOCOL

CLAIM OF PRIORITY

This application claims priority under 35 U.S.C §119 to European Patent Application No. 10305594 filed Jun. 4, 2010, the entire text of which is specifically incorporated by reference herein.

BACKGROUND OF THE INVENTION

1. Field of the Invention

The field of the invention is data processing, or, more specifically, methods, apparatus, and products for translating between an Ethernet protocol and a Converged Enhanced Ethernet (CEE) protocol.

2. Description of Related Art

Existing Ethernet solutions consist of a device driver and a network adapter. Both communicate through a number of queues, which have individual flow control to define a traffic pattern between driver and network through the adapter, like for example a maximum send rate on the network link. Network Messages to be sent and received are typically buffered in server memory, which is larger than the amount of buffers needed to fulfill server internal flow control requirements. This decouples the end requirements from upper layers in the operating system from network parameters. A Converged Enhanced Ethernet (CEE) network adapter uses the direct proprietary communication to the driver for controlling backpressure to guarantee the network defined traffic flow control parameters. Existing non-CEE network adapters do not have such a mechanism built in, and therefore cannot support the Converged Enhanced Ethernet (CEE) protocol.

SUMMARY OF THE INVENTION

Methods, network engine adapters, and products for translating between an Ethernet protocol used by a first network component and a Converged Enhanced Ethernet (CEE) protocol used by a second network component are disclosed. The first network component is coupled to the second network component through a CEE Converter. The CEE converter is implemented independently and separate from the first and second network components and offloads credit based flow management among the first and second network components. Translation includes, for data flow from the first network component to the second network component: receiving, by the CEE converter, traffic flow definition parameters for a single CEE protocol data flow; calculating, by a credit manager implemented as part of the CEE converter, available buffer space in an outbound frame buffer of the CEE converter for the data flow; communicating, by the credit manager to a CEE credit driver executing in the first network component, the calculated size of the buffer space together with a start sequence number and a flow identifier; and responding, by the CEE credit driver to the CEE converter, with Ethernet frames comprising a private header that includes the flow identifier and a sequence number.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

A preferred embodiment of the invention, as described in detail below, is shown in the drawings, in which.

DETAILED DESCRIPTION OF EXEMPLARY EMBODIMENTS

Figure 1:
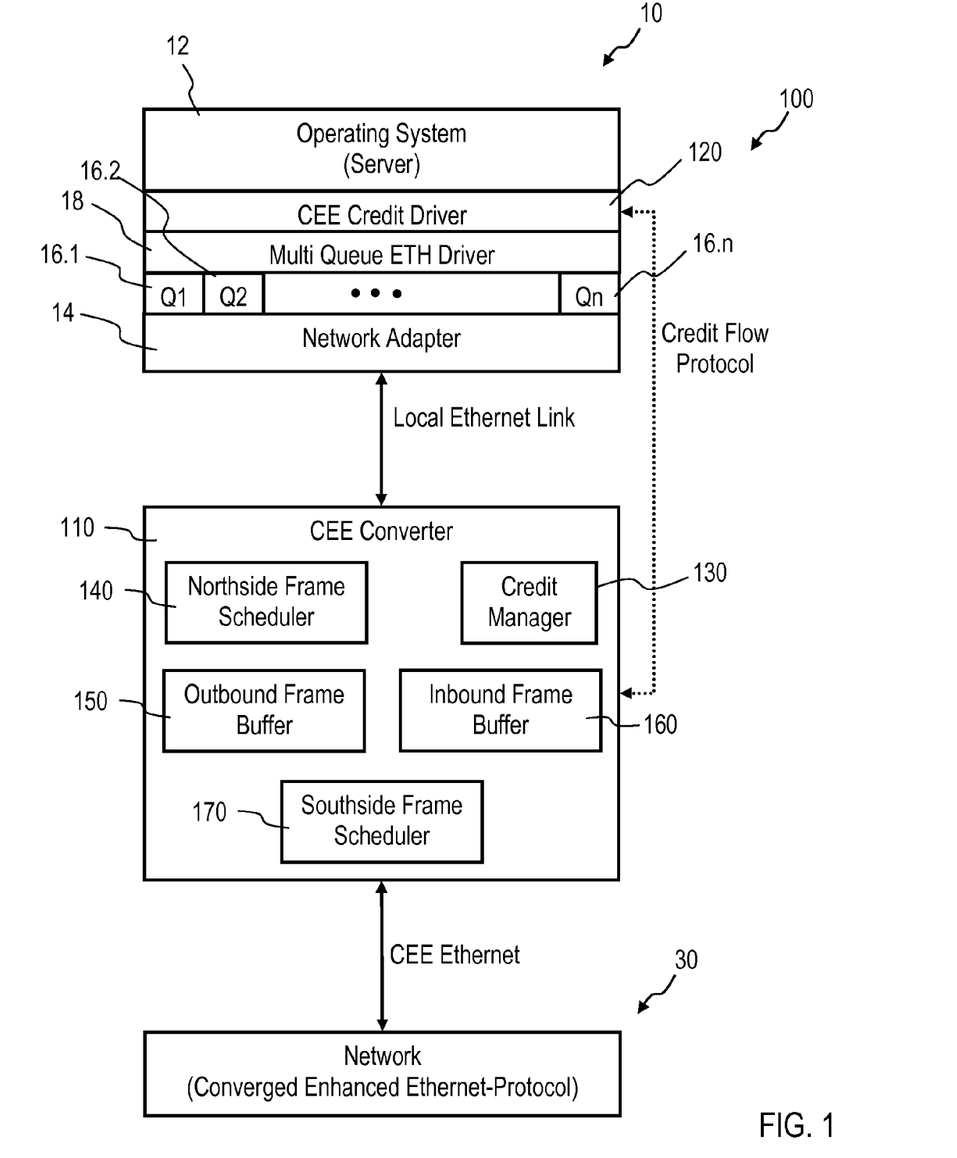
FIG. 1 is a schematic block diagram of a computer network providing at least two network component and at least one network engine adapter, in accordance with an embodiment of the present invention.

FIG. 1 is showing a part of a computer network providing at least a first network component 10 comprising an operating system 12 (server), a network adapter 14, a multi queue Ethernet (Eth) device driver 18 and a number of queues Q1 to Qn, having individual flow control to define traffic patterns between multi queue Ethernet (Eth) device driver 18 and a second network component 30 through the network adapter 14, wherein the second network component 30 uses a Converged Enhanced Ethernet (CEE) protocol.

Existing Ethernet solutions consist of a device driver and a network adapter, communicating through a number of queues, which have individual flow control to define a traffic pattern between the driver and a network through the adapter, like for example a maximum send rate on the network link. Network messages to be sent and received are typically buffered in a memory located in a server, which is larger than the amount of buffers needed to fulfill server internal flow control requirements. This decouples the end requirements from upper layers in the operating system from network parameters. A Converged Enhanced Ethernet (CEE) network adapter uses the direct proprietary communication to the driver for controlling backpressure to guarantee the network defined traffic flow control parameters. Existing non-CEE network adapters don't have such a mechanism built in, and therefore can't support Converged Enhanced Ethernet (CEE).

According to the invention a network engine adapter 100 is arranged in a communication path between the first network component 10 using an Ethernet (Eth) protocol and the second network component 30 using a Converged Enhanced Ethernet (CEE) protocol to translate between said Ethernet protocol and said Converged Enhanced Ethernet (CEE) protocol offload implementing a credit based flow management for reliably sending and/or receiving frames between the first network component 10 and the second network component 30, wherein a mechanism to drop Ethernet messages is implemented as part of the flow management.

FIG. 1 shows a preferred embodiment for implementing the network engine adapter 100 and there could be several similar alternatives for implementing the same architecture within the scope of this invention.

Referring to FIG. 1, for offload implementing the credit based flow management the network engine adapter 100 comprises a Converged Enhanced Ethernet (CEE) converter 110 and a Converged Enhanced Ethernet (CEE) credit driver 120, wherein a credit flow protocol is implemented between the Converged Enhanced Ethernet (CEE) converter 110 and the Converged Enhanced Ethernet (CEE) credit driver 120.

In the shown embodiment of the present invention the Converged Enhanced Ethernet (CEE) credit driver 120 is implemented as part of the first network component 10 between the operating system 12 and the multi queue Ethernet (Eth) device driver 18 and the Converged Enhanced Ethernet (CEE) converter 110 is arranged in a communication path between the first network component 10 and the second network component 30, wherein the Converged Enhanced Ethernet (CEE) converter 110 is connected to the network adapter 14 of the first network component 10 through a local Ethernet link, and to the second network component 30 through Converged Enhanced Ethernet (CEE) links.

Still referring to FIG. 1, the Converged Enhanced Ethernet (CEE) converter 110 comprises an inbound frame buffer 160 used temporary if the Ethernet link is busy, an outbound frame buffer 150 used temporary if the frame currently is not be scheduled on the second network component 30, a southside frame scheduler 170 implementing traffic flow mechanism to/from the second network component 30 as defined by Converged Enhanced Ethernet (CEE) protocol Standards, a northside frame scheduler 140 selecting which frame to send next to the first network component 10 depending on credit state in a credit manager 130, Converged Enhanced Ethernet (CEE) protocol timing parameters and fill state of the outbound frame buffer 150, and the credit manager 130 providing credit information to the Converged Enhanced Ethernet (CEE) credit driver 120 and checking all frames sent from the Converged Enhanced Ethernet (CEE) credit driver 120 if credit parameters in extended frame header are matching and dropping non matching frames. The Converged Enhanced Ethernet (CEE) converter 110 uses base pause frames to reduce frame drops on Ethernet link.

In other words, a method for translating between the Ethernet (Eth) protocol used by the first network component 10 and the Converged Enhanced Ethernet (CEE) protocol used by the second network component 30, according to embodiments of the present invention is offload implementing a credit based flow management for reliably sending and/or receiving frames between the first network component 10 and the second network component 30, wherein a mechanism to drop Ethernet messages is implemented as part of the flow management.

Figure 2:
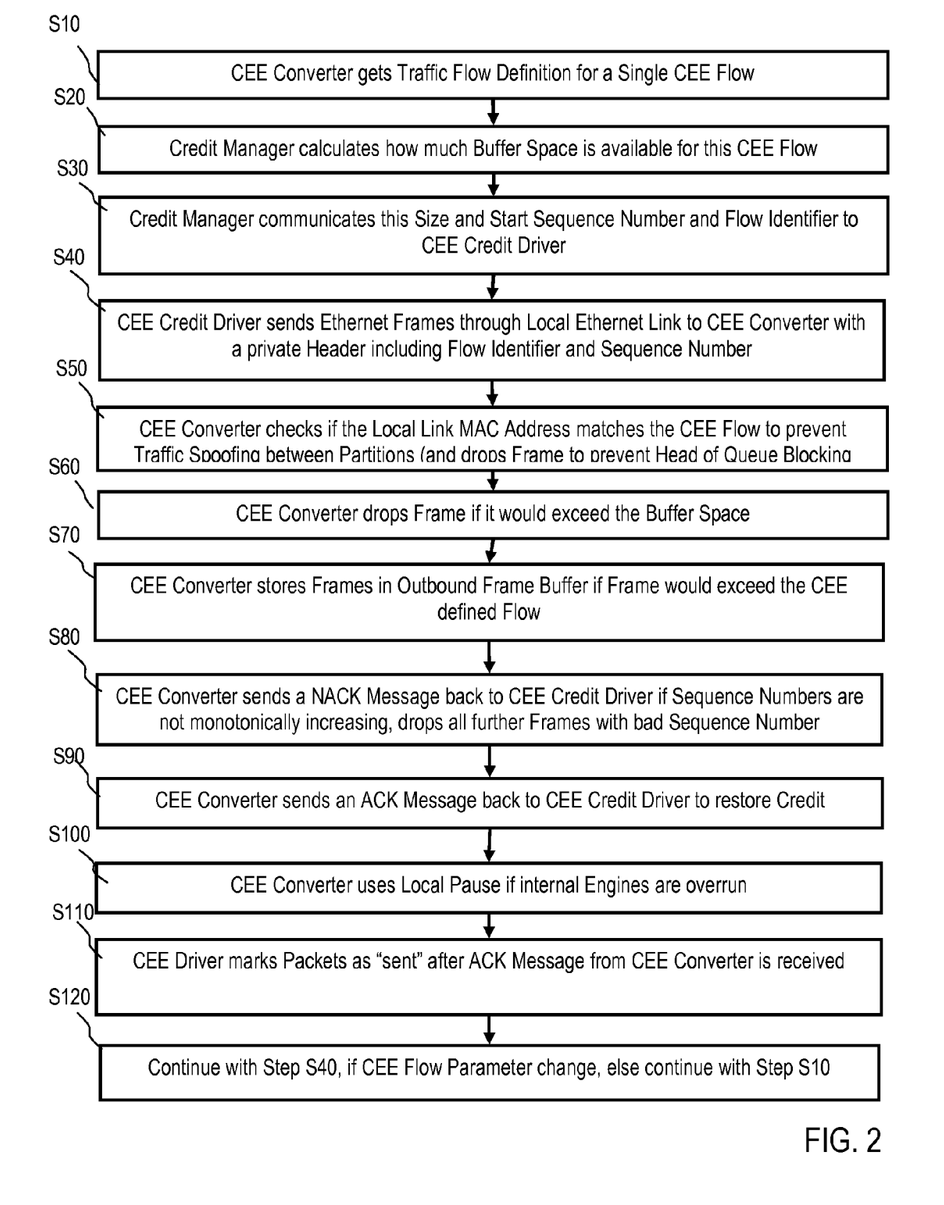
FIG. 2 is a schematic flow chart of an outbound data flow of a method for translating between an Ethernet (Eth) protocol and a Converged Enhanced Ethernet (CEE) protocol, in accordance with an embodiment of the present invention.

FIG. 2 is a schematic flow chart of an outbound data flow of a method for translating between the Ethernet (Eth) protocol and the Converged Enhanced Ethernet (CEE) protocol, in accordance with an embodiment of the present invention.

Referring to FIG. 2 the flowchart depicts how the network engine adapter 100 is working during the outbound data flow. In case of the outbound data flow the Converged Enhanced Ethernet (CEE) converter 110 gets traffic flow definition parameters for a single Converged Enhanced Ethernet (CEE) protocol data flow in step S10 and the credit manager 130 calculates in step S20 how much buffer space is available in the outbound frame buffer 150 of the Converged Enhanced Ethernet (CEE) converter (110) for the data flow. In step S30 the credit manager 130 communicates the calculated size of the buffer space together with a start sequence number and a flow identifier to the Converged Enhanced Ethernet (CEE) credit driver 120 in the first network component 10. During step S40 the Converged Enhanced Ethernet (CEE) credit driver 120 sends Ethernet frames comprising a private header including the flow identifier and a sequence number through the local Ethernet link to the Converged Enhanced Ethernet (CEE) converter 110. In steps S50 the Converged Enhanced Ethernet (CEE) converter 110 checks if a local link MAC address matches the Converged Enhanced Ethernet (CEE) protocol data flow to prevent traffic spoofing between partitions and drops frame to prevent head of queue blocking. In step S60 the Converged Enhanced Ethernet (CEE) converter 110 drops a frame of said CEE protocol data flow if the frame would exceed the size of the free space of the outbound frame buffer 150. During step S70 the Converged Enhanced Ethernet (CEE) converter 110 stores frames in the outbound frame buffer 150 if the frames would exceed the defined Converged Enhanced Ethernet (CEE) protocol data flow. In step S80 the Converged Enhanced Ethernet (CEE) converter 110 sends back a first message to the Converged Enhanced Ethernet (CEE) credit driver 120, if said sequence numbers are not monotonically increasing and drops all further frames with bad sequence numbers, else the Converged Enhanced Ethernet (CEE) converter 110 sends back a second message to Converged Enhanced Ethernet (CEE) credit driver 120 to restore credit in step S90. The first message is representing a not-acknowledgement message and the second message is representing an acknowledgement message. During step S100 the Converged Enhanced Ethernet (CEE) converter 110 uses local pause frames, if internal engines are overrun. In step S110 the Converged Enhanced Ethernet (CEE) credit driver 120 marks packets as "sent" after receiving the second message (acknowledgement message) from the Converged Enhanced Ethernet (CEE) converter 110.

In step S120 the Converged Enhanced Ethernet (CEE) flow parameters are checked, wherein the method continues with step S40, if the Converged Enhanced Ethernet (CEE) flow parameters have been changed, otherwise the method continues with step S10.

Figure 3:
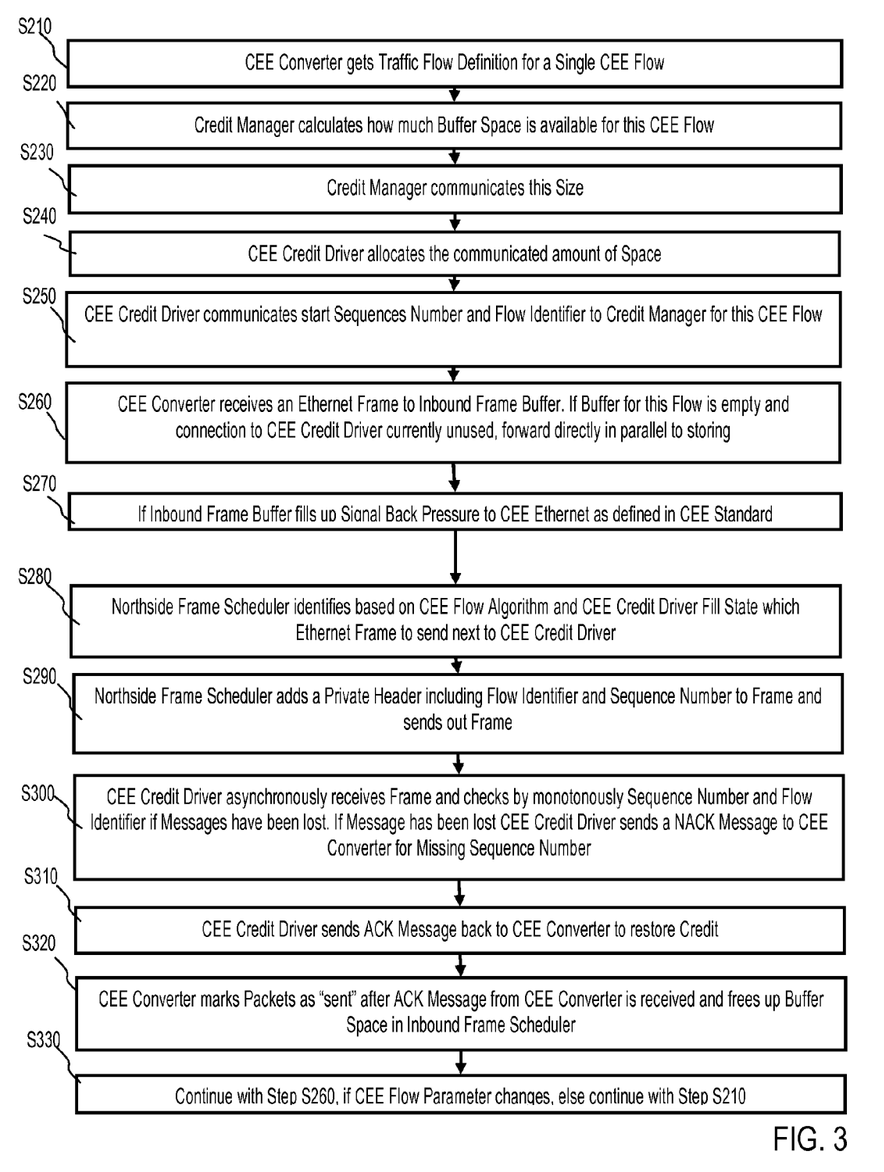
FIG. 3 is a schematic flow chart of an inbound data flow of the method for translating between an Ethernet (Eth) protocol and a Converged Enhanced Ethernet (CEE) protocol, in accordance with an embodiment of the present invention.

FIG. 3 is a schematic flow chart of an inbound data flow of the method for translating between an Ethernet (Eth) protocol and a Converged Enhanced Ethernet (CEE) protocol, in accordance with an embodiment of the present invention Referring to FIG. 3 the flowchart depicts how the network engine adapter 100 is working during the inbound data flow. In case of an inbound data flow the Converged Enhanced Ethernet (CEE) converter 110 gets traffic flow definition parameters for a single Converged Enhanced Ethernet (CEE) protocol data flow in step S210. In step S220 the credit manager 130 calculates how much buffer space is available in an inbound frame buffer 160 of the Converged Enhanced Ethernet (CEE) converter 110 for the data flow. In step S230 the credit manager 130 communicates the calculated size of the buffer space to the Converged Enhanced Ethernet (CEE) credit driver 120 in the first network component 10. In step S240 the said Converged Enhanced Ethernet (CEE) credit driver 120 allocates the communicated amount of buffer space and communicates a start sequence number and a flow identifier to the credit manager 130 for the Converged Enhanced Ethernet (CEE) protocol data flow in step S250. In step S260 the Converged Enhanced Ethernet (CEE) converter 110 receives an Ethernet frame to the inbound frame buffer 160, wherein the Ethernet frame is directly forwarded in parallel to storing, if the inbound frame buffer 160 of the Converged Enhanced Ethernet (CEE) credit driver 120 is empty and a connection to the Converged Enhanced Ethernet (CEE) credit driver 120 is currently unused. In step S270 a back pressure as defined in Converged Enhanced Ethernet (CEE) protocol Standard is signaled to the second network component 30, if the inbound frame buffer 160 fills up, wherein the northside frame scheduler 140 identifies in step S280 which Ethernet frame is to send next to the Converged Enhanced Ethernet (CEE) credit driver 120 based on Converged Enhanced Ethernet (CEE) flow algorithm and Converged Enhanced Ethernet (CEE) credit driver 120 fill state. During step S290 the northside frame scheduler 140 adds a private header including the flow identifier and the sequence number to the Ethernet frame and sends out the frame. In step S300 the Converged Enhanced Ethernet (CEE) credit driver 120 receives Ethernet frames asynchronously and checks by monotonously sequence number and flow identifier if messages have been lost, wherein the Converged Enhanced Ethernet (CEE) credit driver 120 sends a first message back to the Converged Enhanced Ethernet (CEE) converter 110, if at least on sequence number is missing, otherwise the Converged Enhanced Ethernet (CEE) credit driver 120 sends a second message back to the Converged Enhanced Ethernet (CEE) converter 110 in step S310 to restore credit. Analogous to the outbound data flow, the first message is representing a not-acknowledgement message and the second message is representing an acknowledgement message. In step S320 the Converged Enhanced Ethernet (CEE) converter 110 marks packets as "sent" after receiving the second message (acknowledgement message) from said Converged Enhanced Ethernet (CEE) credit driver 120 and frees up buffer space in the inbound frame buffer 160.

In step S330 the Converged Enhanced Ethernet (CEE) flow parameters are checked, wherein the method continues with step S260, if the Converged Enhanced Ethernet (CEE) flow parameters have been changed, otherwise the method continues with step S210.

Embodiments of the inventive method for translating between an Ethernet (Eth) protocol and a Converged Enhanced Ethernet (CEE) protocol can be implemented as an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for translating between an Ethernet protocol used by a first network component and a Converged Enhanced Ethernet (CEE) protocol used by a second network component, the first network component coupled to the second network component through a CEE Converter, the CEE converter implemented independently and separate from the first and second network components and offloading credit based flow management among the first and second network components, the method comprising:
   for data flow from the first network component to the second network component:
   receiving, by the CEE converter, traffic flow definition parameters for a single CEE protocol data flow;
   calculating, by a credit manager implemented as part of the CEE converter, available buffer space in an outbound frame buffer of the CEE converter for the data flow;
   communicating, by the credit manager to a CEE credit driver executing in the first network component, the calculated size of the buffer space together with a start sequence number and a flow identifier;
   responding, by the CEE credit driver to the CEE converter, with Ethernet frames comprising a private header that includes the flow identifier and a sequence number; and
   in response to a determination, by the CEE converter, that the sequence numbers are monotonically increasing:
   sending, by the CEE converter to the CEE credit driver, a second message to restore credit representing an acknowledgement message.

2. The method according to claim 1, further comprising:
   checking, by the CEE converter, whether a local link Media Access Control (MAC) address matches the CEE protocol data flow; and
   dropping, by the CEE converter, a frame of the CEE protocol data flow if the frame would exceed the outbound frame buffer space.

3. The method according to claim 1, further comprising:
   storing, by CEE converter, frames in the outbound frame buffer, if the frames would exceed the defined CEE protocol data flow.

4. The method according to claim 1, further comprising:
   in response to a determination, by the CEE converter, that the sequence numbers are not monotonically increasing:
   sending, by the CEE converter to the CEE credit driver, a first message; and
   dropping, by the CEE converter, all further frames with bad sequence numbers;
   wherein sending, by the CEE converter to the CEE credit driver, the second message to restore credit representing the acknowledgement message comprises:
   using, by the CEE converter when internal engines are overrun, local pause frames; and
   marking, by the CEE credit driver, packets as "sent" after receiving the second message from the CEE converter.

5. The method according to claim 1, further comprising:
   for data flow from the second network component to the first network component:

receiving, by the CEE converter from the second network component, traffic flow definition parameters for a single CEE protocol data flow;

calculating, by the credit manager, available buffer space in an inbound frame buffer of the CEE converter for the data flow; and communicating, by the credit manager to the CEE credit driver, the calculated size of buffer space.

6. The method according to claim 5, further comprising:

allocating, by the CEE credit driver, the communicated amount of buffer space;

communicating, by the CEE credit driver to the credit manager for the CEE protocol data flow, a start sequence number and a flow identifier;

receiving, by the CEE converter, an Ethernet frame to the inbound frame buffer, forwarding, by the CEE converter, the Ethernet frame directly in parallel to storing the Ethernet frame, if the inbound frame buffer of the CEE credit driver is empty and a connection to the CEE credit driver is currently unused, signaling, by the CEE converter to the second network component, a back pressure if the inbound frame buffer fills up, identifying, by a northside frame scheduler of the CEE converter, an Ethernet frame to send next to the CEE credit driver based on a CEE flow algorithm and CEE credit driver fill state;

adding, by the northside frame scheduler to the Ethernet frame, a private header including the flow identifier and the sequence number; and sending the Ethernet frame out.

7. The method according to claim 6, further comprising:

receiving, by the CEE credit driver, Ethernet frames asynchronously;

checking sequence number and flow identifier of the Ethernet frames if messages have been lost, determining, by the CEE credit driver, whether at least one sequence number is missing;

if at least one sequence number is missing, sending, by the CEE credit driver to the CEE converter, a first message;

if at least one sequence number is not missing, sending, by the CEE credit driver to the CEE converter, a second message to restore credit.

8. The method according to claim 7, further comprising:

marking, by the CEE converter, packets as "sent" after receiving the second message from the CEE credit driver; and freeing, by the CEE converter, buffer space in the inbound frame buffer.

9. A network engine adapter arranged in a communication path between a first network component using an Ethernet protocol and a second network component using a CEE protocol to translate between the Ethernet protocol and the CEE protocol, the network engine adapter comprising a CEE converter and a CEE driver, the first network component coupled to the second network component through a CEE Converter, the CEE converter implemented independently and separate from the first and second network components and offloading credit based flow management among the first and second network components, the network engine adapter comprising one or more processors and computer memory storing computer program instructions that, when executed by one or more of the processors, causes the network engine adapter to carry out the steps of:

for data flow from the first network component to the second network component:

receiving, by the CEE converter, traffic flow definition parameters for a single CEE protocol data flow;

calculating, by a credit manager implemented as part of the CEE converter, available buffer space in an outbound frame buffer of the CEE converter for the data flow;

communicating, by the credit manager to a CEE credit driver executing in the first network component, the calculated size of the buffer space together with a start sequence number and a flow identifier;

responding, by the CEE credit driver to the CEE converter, with Ethernet frames comprising a private header that includes the flow identifier and a sequence number; and in response to a determination, by the CEE converter, that the sequence numbers are monotonically increasing:

sending, by the CEE converter to the CEE credit driver, a second message to restore credit representing an acknowledgement message.

10. The network engine adapter according to claim 9, further comprising computer program instructions that, when executed, cause the network engine adapter to carry out the steps of:

checking, by the CEE converter, whether a local link Media Access Control (MAC) address matches the CEE protocol data flow; and dropping, by the CEE converter, a frame of the CEE protocol data flow if the frame would exceed the outbound frame buffer space.

11. The network engine adapter according to claim 9, further comprising computer program instructions that, when executed, cause the network engine adapter to carry out the step of:

storing, by CEE converter, frames in the outbound frame buffer, if the frames would exceed the defined CEE protocol data flow.

12. The network engine adapter according to claim 9, further comprising computer program instructions that, when executed, cause the network engine adapter to carry out the steps of:

in response to a determination, by the CEE converter, that the sequence numbers are not monotonically increasing:

sending, by the CEE converter to the CEE credit driver, a first message; and dropping, by the CEE converter, all further frames with bad sequence numbers;

wherein sending, by the CEE converter to the CEE credit driver, a second message to restore credit representing the acknowledgement message comprises:

using, by the CEE converter when internal engines are overrun, local pause frames; and marking, by the CEE credit driver, packets as "sent" after receiving the second message from the CEE converter.

13. The network engine adapter according to claim 9, further comprising computer program instructions that, when executed, cause the network engine adapter to carry out the steps of:

for data flow from the second network component to the first network component:

receiving, by the CEE converter from the second network component, traffic flow definition parameters for a single CEE protocol data flow;

calculating, by the credit manager, available buffer space in an inbound frame buffer of the CEE converter for the data flow; and communicating, by the credit manager to the CEE credit driver, the calculated size of buffer space.

14. The network engine adapter according to claim 13, further comprising computer program instructions that, when executed, cause the network engine adapter to carry out the steps of:
  allocating, by the CEE credit driver, the communicated amount of buffer space;
  communicating, by the CEE credit driver to the credit manager for the CEE protocol data flow, a start sequence number and a flow identifier,
  receiving, by the CEE converter, an Ethernet frame to the inbound frame buffer,
  forwarding, by the CEE converter, the Ethernet frame directly in parallel to storing the Ethernet frame, if the inbound frame buffer of the CEE credit driver is empty and a connection to the CEE credit driver is currently unused,
  signaling, by the CEE converter to the second network component, a back pressure if the inbound frame buffer fills up,
  identifying, by a northside frame scheduler of the CEE converter, an Ethernet frame to send next to the CEE credit driver based on a CEE flow algorithm and CEE credit driver fill state;
  adding, by the northside frame scheduler to the Ethernet frame, a private header including the flow identifier and the sequence number; and
  sending the Ethernet frame out.

15. The network engine adapter according to claim 14, further comprising computer program instructions that, when executed, cause the network engine adapter to carry out the steps of:
  receiving, by the CEE credit driver, Ethernet frames asynchronously;
  checking sequence number and flow identifier of the Ethernet frames if messages have been lost,
  determining, by the CEE credit driver, whether at least one sequence number is missing;
  if at least one sequence number is missing, sending, by the CEE credit driver to the CEE converter, a first message;
  if at least one sequence number is not missing, sending, by the CEE credit driver to the CEE converter, a second message to restore credit.

16. The network engine adapter according to claim 15, further comprising computer program instructions that, when executed, cause the network engine adapter to carry out the steps of:
  marking, by the CEE converter, packets as "sent" after receiving the second message from the CEE credit driver; and
  freeing, by the CEE converter, buffer space in the inbound frame buffer.

17. A computer program product for translating between an Ethernet protocol used by a first network component and a Converged Enhanced Ethernet (CEE) protocol used by a second network component, the first network component coupled to the second network component through a CEE Converter, the CEE converter implemented independently and separate from the first and second network components and offloading credit based flow management among the first and second network components, the computer program product comprising computer program instructions stored on a non-transitory computer readable storage medium, wherein the computer readable storage medium is not a signal, the computer program instructions, when executed, carry out the steps of:
  for data flow from the first network component to the second network component:
    receiving, by the CEE converter, traffic flow definition parameters for a single CEE protocol data flow;
    calculating, by a credit manager implemented as part of the CEE converter, available buffer space in an outbound frame buffer of the CEE converter for the data flow;
    communicating, by the credit manager to a CEE credit driver executing in the first network component, the calculated size of the buffer space together with a start sequence number and a flow identifier;
    responding, by the CEE credit driver to the CEE converter, with Ethernet frames comprising a private header that includes the flow identifier and a sequence number; and
    in response to a determination, by the CEE converter, that the sequence numbers are monotonically increasing:
      sending, by the CEE converter to the CEE credit driver, a second message to restore credit representing an acknowledgement message.

18. The computer program product according to claim 17, further comprising computer program instructions that, when executed, carry out the steps of:
  checking, by the CEE converter, whether a local link Media Access Control (MAC) address matches the CEE protocol data flow; and
  dropping, by the CEE converter, a frame of the CEE protocol data flow if the frame would exceed the outbound frame buffer space.

19. The computer program product according to claim 17, further comprising computer program instructions that, when executed, carry out the step of:
  storing, by CEE converter, frames in the outbound frame buffer, if the frames would exceed the defined CEE protocol data flow.

20. The computer program product according to claim 17, further comprising computer program instructions that, when executed, carry out the steps of:
  in response to a determination, by the CEE converter, that the sequence numbers are not monotonically increasing:
    sending, by the CEE converter to the CEE credit driver, a first message; and
    dropping, by the CEE converter, all further frames with bad sequence numbers;
  wherein sending, by the CEE converter to the CEE credit driver, a second message to restore credit representing the acknowledgement message comprises:
    using, by the CEE converter when internal engines are overrun, local pause frames; and
    marking, by the CEE credit driver, packets as "sent" after receiving the second message from the CEE converter.

21. The computer program product according to claim 17, further comprising computer program instructions that, when executed, carry out the steps of:
  for data flow from the second network component to the first network component:
    receiving, by the CEE converter from the second network component, traffic flow definition parameters for a single CEE protocol data flow;
    calculating, by the credit manager, available buffer space in an inbound frame buffer of the CEE converter for the data flow; and
    communicating, by the credit manager to the CEE credit driver, the calculated size of buffer space.

22. The computer program product according to claim 21, further comprising computer program instructions that, when executed, carry out the steps of:
  allocating, by the CEE credit driver, the communicated amount of buffer space;

communicating, by the CEE credit driver to the credit manager for the CEE protocol data flow, a start sequence number and a flow identifier, receiving, by the CEE converter, an Ethernet frame to the inbound frame buffer, forwarding, by the CEE converter, the Ethernet frame directly in parallel to storing the Ethernet frame, if the inbound frame buffer of the CEE credit driver is empty and a connection to the CEE credit driver is currently unused, signaling, by the CEE converter to the second network component, a back pressure if the inbound frame buffer fills up, identifying, by a northside frame scheduler of the CEE converter, an Ethernet frame to send next to the CEE credit driver based on a CEE flow algorithm and CEE credit driver fill state;

adding, by the northside frame scheduler to the Ethernet frame, a private header including the flow identifier and the sequence number; and sending the Ethernet frame out.

23. The computer program product according to claim 22, further comprising computer program instructions that, when executed, carry out the steps of:
receiving, by the CEE credit driver, Ethernet frames asynchronously;
checking sequence number and flow identifier of the Ethernet frames if messages have been lost,
determining, by the CEE credit driver, whether at least one sequence number is missing;
if at least one sequence number is missing, sending, by the CEE credit driver to the CEE converter, a first message;
if at least one sequence number is not missing, sending, by the CEE credit driver to the CEE converter, a second message to restore credit.

24. The computer program product according to claim 23, further comprising computer program instructions that, when executed, carry out the steps of:
marking, by the CEE converter, packets as "sent" after receiving the second message from the CEE credit driver; and
freeing, by the CEE converter, buffer space in the inbound frame buffer.

\* \* \* \* \*